United States Patent [19]

Harlen

[11] Patent Number: 5,588,715
[45] Date of Patent: Dec. 31, 1996

[54] NON-ROTATING WHEEL COVER ASSEMBLY

[76] Inventor: Charles D. Harlen, 2006 Wooddale Dr., Huntsville, Ala. 35801

[21] Appl. No.: 263,372

[22] Filed: Jun. 20, 1994

[51] Int. Cl.$^6$ ........................................................ B60B 7/20
[52] U.S. Cl. ........................................ 301/37.25; 301/37.1
[58] Field of Search .................................. 301/37.1, 37.38, 301/37.25, 108.1, 108.2, 108.3, 108.4; 40/587

[56] References Cited

U.S. PATENT DOCUMENTS

| | | | |
|---|---|---|---|
| 1,739,577 | 12/1929 | Cantu | 301/37.25 |
| 2,548,070 | 4/1951 | Ryan | 301/37.25 X |
| 2,707,131 | 4/1955 | Sundberg | 40/587 |
| 2,759,282 | 8/1956 | Lecourt | 40/587 |
| 2,869,262 | 1/1959 | Lucas | 301/37.25 X |
| 2,935,361 | 5/1960 | Aske | 301/37.25 |
| 3,457,663 | 7/1969 | Beaudoin et al. | 40/587 |
| 3,495,347 | 2/1970 | Sims | 301/37.25 X |
| 3,810,679 | 5/1974 | Myers | 301/37.25 X |
| 5,190,354 | 3/1993 | Levy et al. | 301/37.25 |

FOREIGN PATENT DOCUMENTS

| | | | |
|---|---|---|---|
| 1545122 | 11/1967 | France | 40/587 |
| 200689 | 7/1923 | United Kingdom | 301/37.25 |

Primary Examiner—Russell D. Stormer
Attorney, Agent, or Firm—John C. Garvin, Jr.; Harold W. Hilton

[57] ABSTRACT

A non-rotatable wheel cover assembly including a mounting assembly for mounting the wheel cover directly to a wheel supporting member of a vehicle. The wheel cover has inner and outer surfaces and the wheel supporting member is disposed for supporting wheels of the vehicle during rotation thereof. The mounting assembly includes a first attaching element mounted on the inner surface of the wheel cover and a wheel cover support assembly for secured relation of the first attaching element and the wheel supporting member. The wheel cover support assembly is disposed for non-rotational support of the first attaching element and the wheel cover during rotation of the wheel.

10 Claims, 2 Drawing Sheets

1

NON-ROTATING WHEEL COVER ASSEMBLY

FIELD OF THE INVENTION

The invention relates to a wheel cover assembly for motor vehicles and more particularly to a wheel cover assembly that remains non-rotational and stationary with respect to the wheel, thereby presenting a stationary surface, that can continue or correspond to the existing design of the vehicle or incorporate whatever graphics and writing that may be desired.

BACKGROUND OF THE INVENTION

The conventional wheel cover or wheel bares graphics, designs, logos or indicia of the manufacturer, owner or others, and only when the vehicle is motionless can these markings be discerned.

An object of this invention is to provide a stationary non-rotating wheel cover that allows the viewer to read or discern the wheel covers markings when the vehicle is in motion as well as when stationary.

A further object of the present invention is to provide wheel cover assemblies for both the drive and nondrive wheel that can be easily installed and removed, that are securely attached to prevent accidental removal when the vehicle is in motion and to prevent theft.

SUMMARY OF THE INVENTION

Respecting the drive wheels of a vehicle, the present invention provides an axle housing assembly disposed between the wheel cover and the wheel that allows the wheel cover to remain stationary relative to the rotation of the wheel. The front or outside surface of the wheel cover, affixed with designs coordinated with the vehicle, promotional or advertising material, with lighted, or the designs and the like, is a disc which may have a curved or domed disc like shape with ornamental variations in shape and style. The back or inner surface of the wheel cover has a wheel cover mounting assembly secured thereto or formed therewith. The mounting assembly is disposed for secured relation of the wheel cover to the axle of the vehicle. There is a small difference in the weight distribution between the top section and the bottom section of the wheel cover or a separate weight may be provided adjacent the lower peripheral edge of the wheel cover to provide rotational stability and maintain the up/down or top/bottom orientation, when the vehicle is in motion.

Respecting the nondrive wheels of a vehicle, the present invention provides a shoulder bolt having an internally threaded end which attaches to the externally threaded end of the axle of the vehicle. A grease cap having a central opening is secured to the wheel support assembly of the vehicle and extends outwardly therefrom. The central opening of the grease cap is fitted with a grease seal. The shoulder bolt includes a threaded end which passes through the grease cap. The threaded end of the shoulder bolt secures to and supports the wheel cover. The sealed opening in the grease cap permits the threaded end of the shoulder bolt to pass through while maintaining the clean environment required by the wheel bearings and lubricant normally found within nondrive wheels.

DESCRIPTION OF THE PREFERRED EMBODIMENTS

Figure 1:
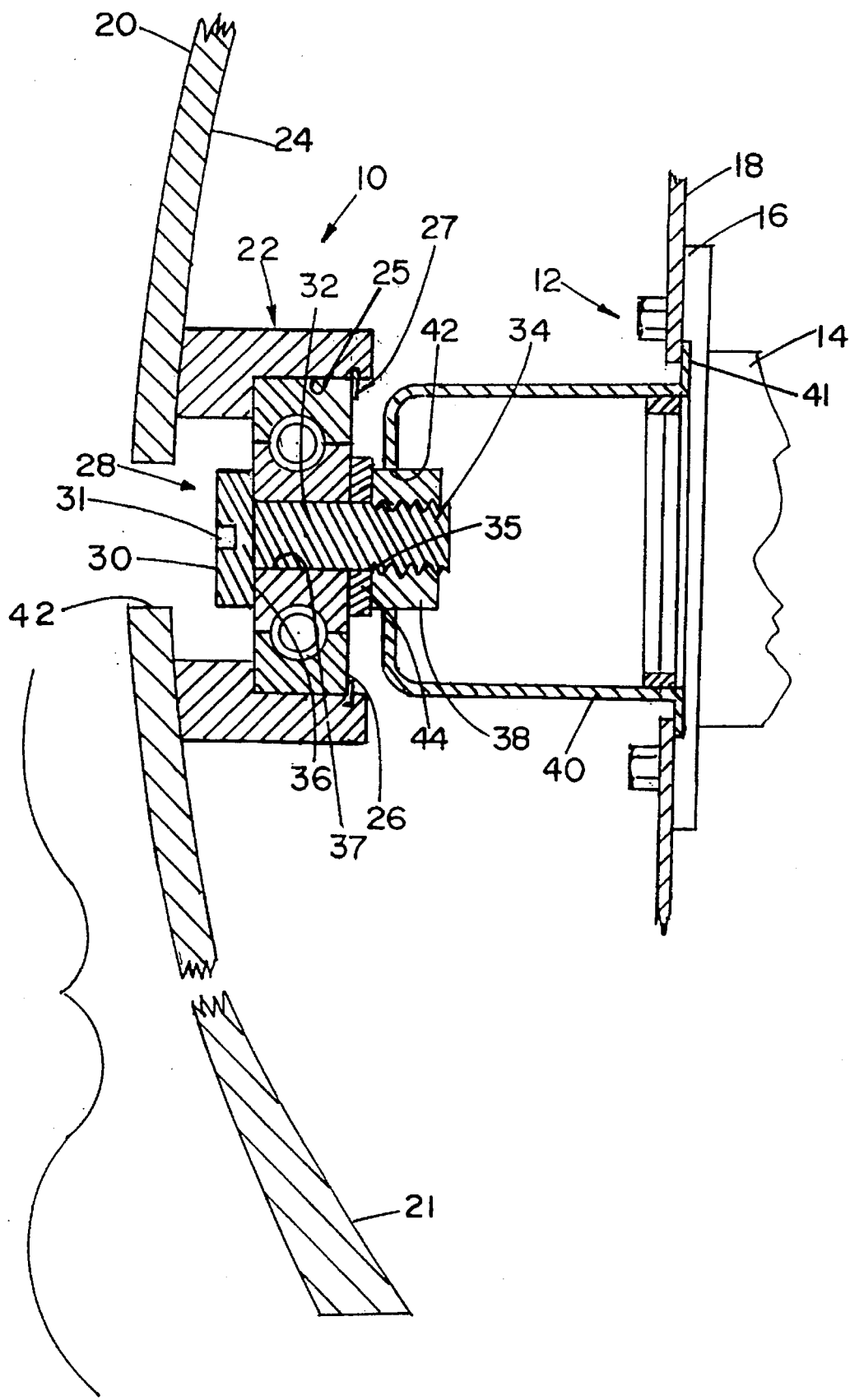
FIG. 1 is a section view of the wheel cover (hubcap) and attaching assembly for securing the wheel cover to the end of a typical axle assembly of the drive wheels of a vehicle. The wheel cover is illustrated as being larger in cross-section adjacent the lower peripheral edge portion thereof to provide added weight to this portion of the wheel cover.

As illustrated by way of example, FIG. 1 depicts the device of the present invention as used with conventional drive wheels of a vehicle. As shown, reference numeral 10 generally designates the wheel cover assembly for a conventional drive wheel assembly 12 of a vehicle. The drive wheel support assembly 12 is shown to include an axle 14 and an axle flange 16 having wheel 18 secured thereto.

Wheel cover assembly 10 includes a wheel cover 20 which is shown as a single member having a disc-like configuration. Wheel cover 20 is provided with a wheel cover attachment member 22 secured or formed on the inner surface 24 thereof. Member 22 extends inwardly of cover member 20 and includes an internal annular recess 25 into which a bearing assembly 26 is secured by a retaining ring 27, for example. The bearing assembly may be a ball bearing assembly or a bushing, as desired. A wheel cover attachment assembly, defined herein as a shoulder bolt 28, includes a head portion 30, an intermediate shaft portion 32, and smaller diameter threaded end portion 34. A first shoulder 36 is formed between portions 30 and 32 and a second shoulder 35 is formed between portion 30 and 34. Shoulder bolt 28 is inserted through the central opening 37 of bearing assembly 26 for threaded relation with a nut 38 permanently affixed to the inner surface of a cup 40 which is secured to axle flange 16 of the wheel assembly. The cup includes a flanged portion 41 mounted between the wheel and the axle flange. The shaft portion 32 and end portion 34 of the shoulder bolt extends through an axial opening 42 of cup member 40. Head portion 30 of shoulder bolt 28 includes an Allen wrench opening 31 to receive an Allen wrench for secured, threaded relation of shoulder bolt 28 to cover 40. The Allen wrench is insertable into opening 31 through central opening 42 provided in wheel cover 20. It is to be understood that while an Allen wrench is described as the tool which engages the shoulder bolt 28 for securing the bolt 28 to the nut 38 provided on cup 40 this is for illustrative purposes only. Other types of fasteners and tools may be resorted to for rotating the attachment assembly to provide the secured relation that is within the spirit and scope of the present invention.

As further shown in FIG. 1, a spacer 44 or plurality of stacked spacers may be provided to permit adjustment of the distance between the peripheral edge of the wheel cover 20 and wheel 18 of the vehicle. Such adjustment maintains the desired spacing between the peripheral edge of the cover and the wheel of the vehicle. The wheel cover 20 is shown (FIG.

1) to include a peripheral edge portion 21 which is an integral portion of the wheel cover and thicker in cross section than the remainder of wheel cover 20 thus providing additional weight to peripheral edge portion 21. The additional weight provides a downward force to the wheel cover 20 to stabilize and maintain wheel cover 20 in a non-rotating position.

Mounting means for mounting wheel cover 20 to the wheel assembly 12 includes first and second attaching means. The first attaching means is an assembly mounted on the inner surface 24 of wheel cover 20 and includes the wheel cover attachment member 22 and ball bearing assembly 26 mounted in member 22. The second attaching means is secured to the wheel supporting assembly of the vehicle and includes cup-shaped member 40 and threaded nut 38. Wheel cover attachment device (shoulder bolt 28) secures the first and second attachment means together for attachment of the wheel cover to the wheel supporting assembly 12. The wheel supporting assembly includes the axle flange 16 and axle 14. The second attaching means include the cup 40 which is secured to the axle flange 16, shoulder bolt 28, nut 38 and spacer 44.

Figure 2:
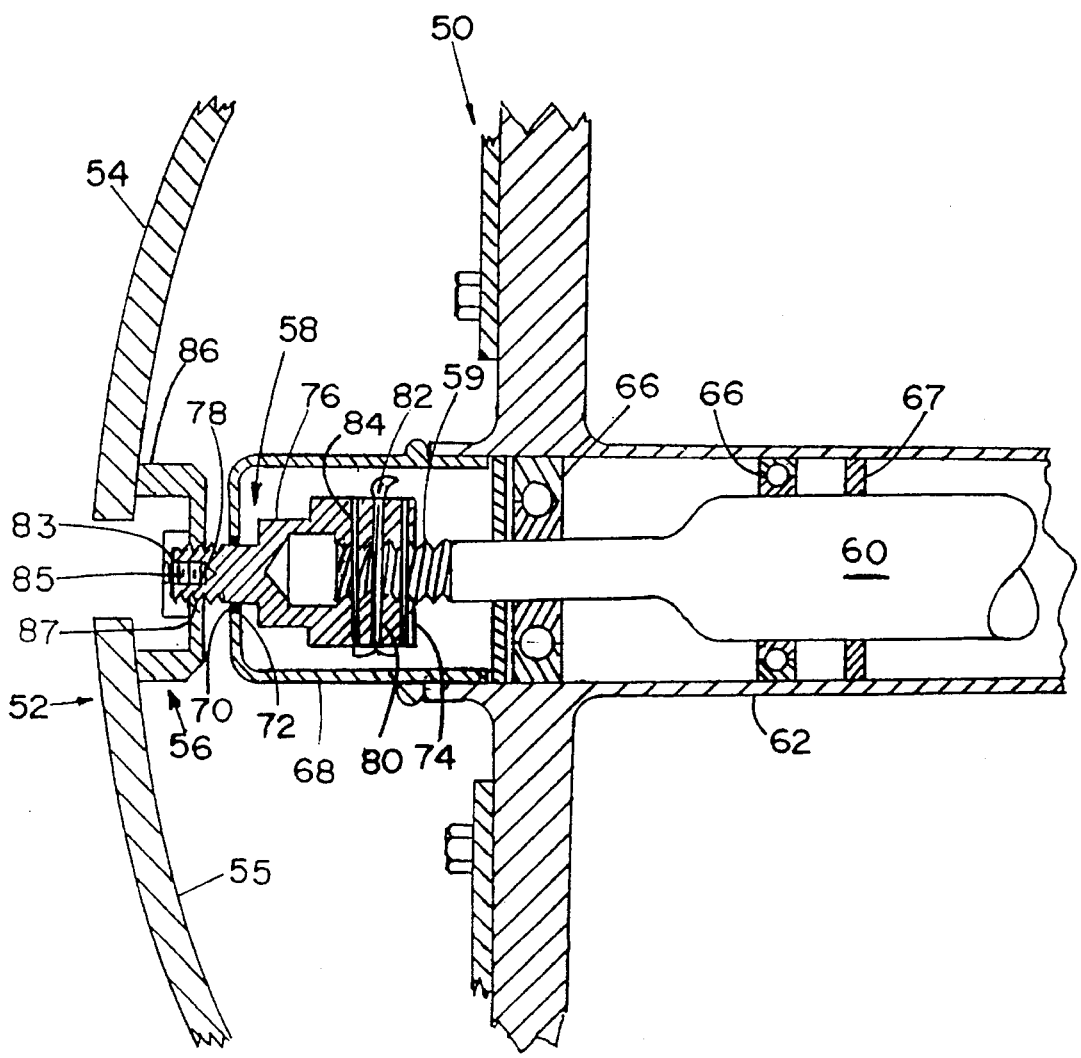
FIG. 2 is a partial section view of the wheel cover (hubcap) and the attaching assembly for securing the wheel cover to the spindle of the non-drive wheels of a vehicle.

FIG. 2 is a partial sectional view illustrating a non-drive wheel 50 of a vehicle. A wheel cover assembly 52 is shown to include a wheel cover 54 and having an inner surface 55 and a wheel cover attachment assembly 56 disposed for attachment to a shoulder bolt 58 which is secured to the distal end 59 of an axle 60 extending out of an axle housing 62. Housing 62 is shown as enclosing an outer bearing assembly 64, an inner bearing assembly 66 and a seal 67, as is conventional is such axle assemblies. A cup like member 68 (typical grease cup) serves to retain bearing lubricant in the axle housing. A seal 70 (such as neoprene) is mounted in an axial opening 72 of grease cup 68. The grease cup may be mounted in a conventional manner as shown in FIG. 2, or if desired, the grease cup may be made more elongated and mounted similar to member 40 of FIG. 1. Shoulder bolt 58 is provided for adjustably secured relation on the distal threaded end 59 of axle 60. The shoulder bolt 58 is shown to include a body having an internally threaded larger diameter end portion 74, an intermediate portion 76 and a smaller diameter externally end threaded portion 78. A transverse bore 80 is provided in the larger diameter end portion 74 to receive a cotter pin 82 therein. The cotter pin is insertable through any one of a series of transverse bores 84 provided in portion 74 of shoulder bolt 58 for adjustably positioning the shoulder bolt along the axle.

The externally threaded end portion 78 of the shoulder bolt is provided with an axially disposed tapped bore 83 to receive a bolt 85 in threaded relation therein. Portion 28 extends through an opening 87 provided in a bracket 86 secured to or formed on the inner surface 55 of the wheel cover and bolt 85 extends into bore 83 to engage bracket 86 and thereby secure the wheel cover to shoulder bolt 58. Bolt 83 is rotated by an Allen wrench which may be inserted into an opening provided in the head of the bolt 85.

Figure 3:
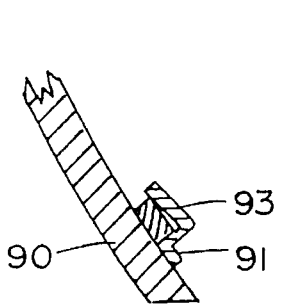
FIG. 3 is a side elevational view of a wheel cover illustrating a separate weight added to the lower peripheral edge of the wheel cover.

FIG. 3 illustrates an alternative manner in which the weight is provided on the lower peripheral edge of the wheel cover of the embodiment of FIG. 1. As shown in FIG. 3, a discrete weight 93 is attached to a spring clip type bracket 91 secured to the lower peripheral surface 90 of the wheel cover. The weight is maintained in the bracket by compression fit between the spring bracket and the back surface of the wheel cover. The weight may also be similar to the weights used in wheel balancing techniques, if desired.

Figure 4:
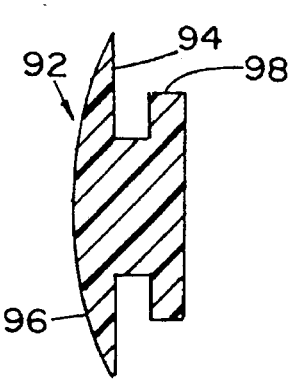
FIG. 4 is an elevational sectional view of a closure member for closing the central opening of the hub cap.

FIG. 4 is a cross-sectional view of a cover member 92 which may be inserted into the central tool opening of the wheel cover and is provided to cover the central opening after assembly of the wheel cover to the vehicle. As seen in FIG. 4, cover member 92 is shown to be provided with a body 94 made of resilient material having an outer portion 96 for covering the central opening and an inner lip 98 which engages the inner surfaces of either wheel shown in FIGS. 1 and 2. To mate the cover member 92 with the wheel cover it is only necessary to compress the lip portion and insert this compressed portion into the opening of the wheel cover. Alternatively, the central opening may be closed by a piece of tape (plastic, metallic, etc.) which is merely adhered to the hub cap over the opening.

The present invention contemplates the provision of limiting means to limit the distance between the periphery of the wheel cover and the wheel. The proper desired distance is achieved by the selection of the spacer 44 of FIG. 1. A thick or thinner spacer may be used as desired or a plurality of spacers of desired thickness may be relied upon. In the embodiment of FIG. 2 the desired spacing between the wheel and peripheral surface of the wheel cover is achieved by selecting the proper bore for insertion of the cotter pin to secure the shoulder bolt to the spindle. It is to be understood that while the above discussion is directed to a spindle having external threads and a shoulder bolt having internal threads for threaded engagement with the external spindle threads the inventions may, alternatively, include a spindle having an axially threaded bore and the shoulder bolt may be threaded on both ends with one of the threaded ends being disposed for attachment to the wheel cover and the second threaded end being disposed for insertion, in threaded relation, in the threaded bore in the end of the spindle.

It is also to be understood that the threaded nut 38 (FIG. 1) may be replaced by a clip-type compression fastener through which the threaded end of the shoulder bolt may be inserted.

While the above description constitutes preferred embodiments of the present invention, it will be appreciated that the invention is susceptible to modification, variation and change without departing from the spirit and scope of the accompanying claims.

I claim:

1. A non-rotatable wheel cover assembly including mounting means for mounting a wheel cover directly to a wheel support assembly of a vehicle, said wheel cover being a single member in the form of a disc and having inner and outer surfaces, and said wheel supporting assembly including a housing enclosing an axle, said axle having a distal threaded end, said wheel supporting assembly disposed for supporting the wheels of said vehicle, said mounting means comprising:

a cup-like member secured to said wheel support assembly, said cup-like member having a top closure portion provided with an axial opening having a seal therein:

first attaching means including a member mounted on said inner surface of said wheel cover and extending inwardly therefrom;

second attaching means including a member having a first end disposed for secured relation with said wheel cover supporting member of said first attaching means and a second end disposed for secured relation with said distal end of said axle, said first attaching means disposed for secured relation with said member of said second attachment means for non-rotational support of said wheel cover, said member of said second attaching means including a first end and a second end, said first end disposed for extending through said seal of said cup-like member for secured relation with said wheel cover supporting member of said first attachment means and said second end disposed for secured relation with said distal end of said axle; and wheel cover position retention means disposed on said wheel cover for retaining the orientation of said wheel cover in a stationary, non-rotating position.

2. A non-rotatable wheel cover assembly as in claim 1 wherein said member of said first attaching means includes bearing means mounted therein.

3. A non-rotatable wheel cover assembly as in claim 2 wherein said second attaching means includes wheel cover support means secured to said wheel supporting assembly and extending outwardly therefrom, said member of said first attaching means being disposed for secured relation with wheel cover support means of said second attachment means.

4. A non-rotatable wheel cover assembly as in claim 1 wherein said retention means provided on said wheel cover is a weight disposed on a predetermined portion of said wheel cover.

5. A non-rotatable wheel cover assembly as in claim 1 including spacer means for providing a desired amount of space between the periphery of said wheel cover and the wheel of the vehicle.

6. A non-rotatable wheel cover assembly as in claim 1 wherein said axle is provided with a transverse opening therethrough adjacent said distal end thereof and said threaded end of said fastener means includes a plurality of transverse openings therethrough, said transverse openings of said fastener means disposed for selective alignment with said transverse opening in said axle and spacer means including a cotter pin for insertion in to a selected one of said plurality of aligned openings whereby said periphery of said wheel cover is positioned in predetermined spaced relation with the wheel of the vehicle.

7. A wheel cover assembly as in claim 6 wherein said distal end of said axle is provided with external threads and said second end of said fastener is provided with internal threads for threadably secured relation on said external threads of said axle.

8. A wheel cover assembly as in claim 7 including limiting means for limiting the distance between the periphery of said wheel cover and said wheel.

9. A stationary wheel cover for mounting to the wheel assembly of a vehicle comprising, in combination:

a vehicle wheel assembly for rotatably supporting a rotatable wheel to a vehicle;

a non-rotatable wheel cover for attachment to said wheel assembly, said wheel cover having inner and outer surfaces;

wheel cover attachment means secured to said inner surface of said wheel cover, said wheel cover attachment means including an inwardly extending member having bearing means mounted therein, said bearing means including a bearing member having a central opening;

wheel assembly attachment means including a cup-like member secured to said wheel assembly and extending outwardly therefrom, said cup-like member having a central threaded opening therein;

securing means for securing said wheel cover attachment means to said wheel assembly attachment means including a bolt having a head portion, an intermediate, inwardly extending, body portion, and an end threaded portion, said intermediate body portion disposed within said central opening of said bearing member and said threaded end portion disposed for threaded attachment with said threaded central opening of said cup-like member;

wheel cover retention means disposed on said wheel cover for retaining the orientation of said wheel cover in a stationary, non-rotating position; and access means defined by a central opening in said wheel cover to permit access to said head portion of said bolt for rotation of said bolt to provide for the threaded attachment thereof with said cup-shaped member.

10. A non-rotatable wheel cover assembly as in claim 9 wherein said retention means provided on said wheel cover is a weight disposed on a predetermined portion of said wheel cover.

* * * * *